United States Patent [19]

Neubauer et al.

[11] Patent Number: 4,853,938
[45] Date of Patent: Aug. 1, 1989

[54] HE—NE GAS DISCHARGE TUBE

[75] Inventors: Rudolf F. W. Neubauer, Braunschweig; Werner W. Jungbluth, Königslutter; Dieter H. Laschinski, Braunschweig, all of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 151,393

[22] Filed: Feb. 2, 1988

[30] Foreign Application Priority Data

Feb. 4, 1987 [DE] Fed. Rep. of Germany ....... 3703304

[51] Int. Cl.$^4$ .............................................. H01S 3/03
[52] U.S. Cl. .......................................... 372/65; 372/61; 372/88; 313/634; 313/636
[58] Field of Search .................... 372/61, 65, 87–88; 313/636, 634, 612

[56]  References Cited

U.S. PATENT DOCUMENTS

| Re. 27,282 | 2/1972 | Kolb, Jr. ............... | 372/87 |
| 3,787,780 | 1/1974 | Powell .................. | 372/65 |
| 3,936,767 | 2/1976 | Besson et al. ........... | 372/65 |
| 3,955,152 | 5/1976 | Lewis .................... | 372/65 |
| 4,001,624 | 1/1977 | Cosco et al. ............ | 313/636 |
| 4,326,178 | 4/1982 | Van Der Brink et al. ... | 372/61 |
| 4,475,202 | 10/1984 | Baron et al. ............ | 372/87 |
| 4,564,948 | 1/1986 | Golser ................... | 372/61 |
| 4,649,546 | 3/1987 | Schmid .................. | 372/61 |
| 4,656,640 | 4/1987 | Peterson et al. ......... | 372/65 |

FOREIGN PATENT DOCUMENTS

| 0979107 | 12/1975 | Canada ................... | 313/636 |
| 2740606 | 4/1979 | Fed. Rep. of Germany ... | 372/65 |
| 0022197 | 2/1979 | Japan .................... | 372/65 |

OTHER PUBLICATIONS

Hernqvist et al.; "Inexpensive . . . Laser Tube Construction"; Optics and Laser Technology; Apr. 1977; pp. 78–80.

Primary Examiner—William L. Sikes
Assistant Examiner—Xuan Thi Vo
Attorney, Agent, or Firm—Salter & Michaelson

[57]  ABSTRACT

He—Ne gas discharge tube having a cylindrical tube body with an inside cathode cylinder and end walls which are inserted into ends of the tube body and which have for two capillary tubes, outside ends of which are closed by means of Brewster windows, exhaust pipe and connecting pin for the cathode cylinder. The tube, the end walls and the capillary tubes consist of calcium alkalisilicate glass or calcium alumosilicate glass. The end walls are sealingly connected by means of glass solder to the tube body, the capillary tubes, the exhaust pipe and the cathode connecting pin. The He—Ne gas discharge tube is characterized by a high helium tightness.

5 Claims, 3 Drawing Sheets

HE—NE GAS DISCHARGE TUBE

BACKGROUND OF THE INVENTION

The invention relates to an He—Ne gas discharge tube.

DESCRIPTION OF THE PRIOR ART

He—Ne gas discharge tubes are used, in particular for measuring arrangements. In the known gas discharge tubes, the individual parts are joined to one another by fusing. In general, this production occurs on automatic machines. Hard glass is used which has a low coefficient of expansion and is quite suitable for production by automatic machines. These gas discharge tubes have the disadvantage that the hard glass used has only a limited helium tightness. For this reason, the gas discharge tubes have only a limited life. It is known to attach the Brewster windows in such gas discharge tubes in a sealing manner by means of a glass solder ring enclosing the Brewster window (DE-A-31 03 385, DE-A-23 26 561, EP-A-119 408, DE-U-72 03 534).

Much longer service life periods are required for many applications, for example for use in space travel and applications in laser gyroscopes.

SUMMARY OF THE INVENTION

It is the object of the invention to develop an He—Ne gas discharge tube in such a manner that the helium losses are much lower than in known gas discharge tubes.

In detail, the object of the invention is a gas discharge tube having a cylindrical tube body with an internal cathode cylinder and end walls which are inserted into the ends of the tube body and are provided with holes, capillary tubes of glass which are inserted into the holes in the end walls and by this means are held in the end walls, an exhaust tip which is mounted in a sealing manner, in one of the end walls, Brewster windows by means of which the external ends of the capillary tubes are closed, anodes in the area of the external ends of the capillary tubes, in which the tube body, the end walls and the capillary tubes consist of alkali silicate glass or calcium alumosilicate glass, the cathode cylinder is provided with a connecting pin which is passed through a hole in one of the end walls and the end walls are joined in a sealing manner by means of glass solder to the tube body, the capillary tubes, the exhaust pipe and the cathode connecting pin.

A further object of the invention is an He—Ne gas discharge tube in which the capillary tubes are provided at their outer ends with hole sections having a greater inside diameter than the inner parts of the capillary tubes, the ends of the capillary tubes provided with the hole sections are sloping at the Brewster angle, the Brewster windows are attached to the sloping face by means of a glass solder layer, and anode connecting pins protruding through the wall in the hole sections are provided.

A further object of the invention is an He—Ne gas discharge tube in which the glass solder is formed as solder disk having holes for the capillary tubes, the exhaust pipe and the cathode connecting pin, which has an outside diameter which essentially corresponds to the outside diameter of the end walls.

Furthermore, the cathode cylinder can be constructed at one end as stop for the adjoining end wall.

In this connection, it is particularly appropriate for the glass solder to be applied on one end wall to its outer surface and on the other end wall to its inner surface. In this arrangement, all soldering operations can be performed by means of a single heating-up of the He—Ne gas discharge tube.

Suitable developments of the gas discharge tube are the subject-matter of the subclaims.

DESCRIPTION OF THE DRAWINGS

The invention is illustrated in an illustrative embodiment in the drawing and is described in detail in the text which follows with the essential features of the invention with reference to the drawing, in which.

DESCRIPTION OF THE PREFERRED EMBODIMENTS

Figure 1:
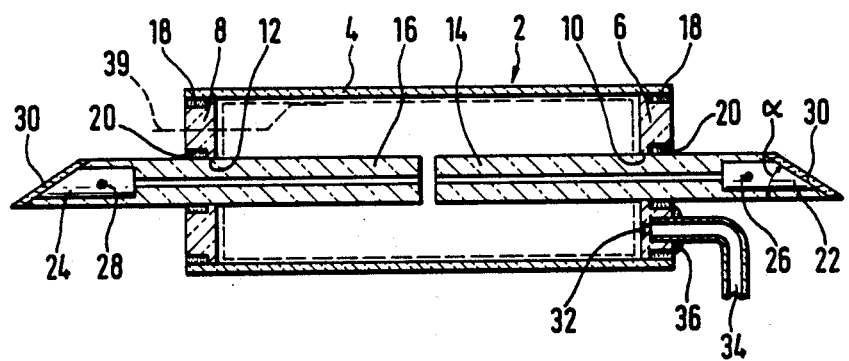
FIG. 1 shows an He—Ne gas discharge tube in longitudinal section.

The gas discharge tube 2 shown in the drawing exhibits a cylindrical tube body 4. Disk-shaped end walls 6, 8 are inserted into the ends of this tube body. The end walls 6 and 8 are provided with central holes 10, 12 into which the capillary tubes 14, 16 are inserted which, in the usual manner, are located at a predetermined distance from one another with their inside ends.

The dimensions for the holes and the other circumference of the ends walls 6 and 8 are selected in such a manner that as little as possible but adequate clearance exists between the end walls and the tube body 4, on the one hand, and the capillary tubes, on the other hand, which is necessary so that a stress-free alignment of the capillary tubes during assembly is possible, taking into consideration the tolerances. The end disks 6 and 8 are provided on their outer circumference with shoulders 18 and on their inner circumference with shoulders 20. Together with the inner tube wall and the outer circumference of the capillary tubes, respectively these shoulders in each case form solder gaps for the accommodation of glass solder which is used for the sealing-type mounting of the capillary tubes in the end walls and of the end walls in the tube body.

In the illustrative embodiment shown, the shoulders 18, 20 on the two disks 6 and 8 are in each case oppositely outwardly directed. The shoulders can also be arranged in the same direction, that is to say they can be directed towards the interior of the tube on one side. They can also be emitted as is described below.

The tube body 4 and the end walls 6, 8 consist of calcium alkali silicate or calcium alumosilicate glasses. Calcium alkalisilicate glasses, which belong to the soft glasses, have the following main components in % by weight. CaO (5–12), alkali (13–20) remainder $SiO_2$. Calcium alumosilicate glasses, which belong to the medium-hard glasses, have a characteristic content in % by weight of $SiO_2$; $Al_2O_3$ (3,5–10); CaO (6–12);-alkali (8–23), remainder $SiO_2$. There can be further components with less than 3% by weight (Espe, "Werkstoffkunde der Hochvakuumtechnik" (Materials science of high-vacuum engineering) vol. 2, page 2; VEB Deutscher Verlag der Wissenschaften, Berlin 1962).

For example, calcium alkalisilicate glass of the usual float glass quality can be used which has a composition of essentially about 72% $SiO_2$, 14% $Na_2O+K_2O$, 9%

CaO, 3–4% MgO and 1% $Al_2O_3$. Such a glass has a density of 2.5 $g/cm^3$ and a linear thermal expansion of $8.5$–$9.5\times10^{-6}$/K. This glass can be used for the tube, the end walls and the capillary tubes. A very useful calcium alumosilicate glass, which is distributed by the German firm of Schott Ruhrglas by the name of "AR-Glas klar", essentially has the following chemical composition (in % by weight) of: 69 $SiO_2$, 1 $B_2O_3$, 4 $Al_2O_3$, 13 $Na_2O$, 3 $K_2O$, 2 BaO, 5 CaO and 3 MgO; the linear coefficient of expansion $\alpha 20/300$ is $9.0\times10^{-6}$/K.; the transformation temperature Tg is 520° C., the density is 2.52 $g/cm^3$. Calcium alkalisilicate glasses and calcium alumosilicate glasses have high helium tightness which is greater by two orders of magnitude than that of the hard glasses from which He—Ne lasers are usually produced so that much longer service life periods can be expected for these gas discharge tubes than in the case of the known gas discharge tubes produced by glass fusion from hard glasses.

A crystallizing glass solder is preferably used as solder material. A crystallizing glass solder "Glas Nr. 8597" by the firm of Schott Glaswerke has been found to be suitable. This glass solder runs at 435° C. and can be reheated to 450° C. after the soldering without losing strength. However, stable glass solders, in particular lead borosilicate types, can also be used.

Figure 2:
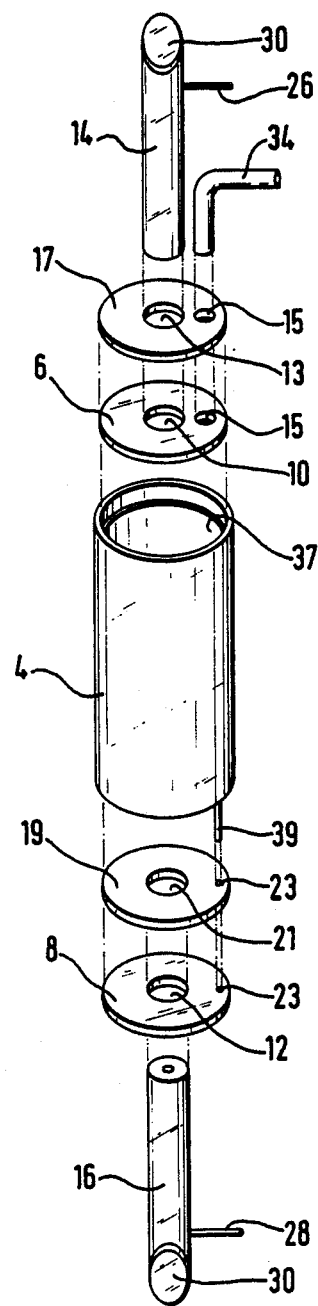
FIG. 2 shows an exploded view of a preferred embodiment of an He—Ne gas discharge tube.

The glass solder can be applied in the form of separate presintered solder rings (width 1 to 2 mm and thickness 2 mm). However, solder disks with appropriate thickness as shown in FIG. 2 can also be used.

The capillary tubes are provided on their external ends with a section 22, 24 having a larger diameter than the capillary diameter. In the space created in this manner anode pins 26, 28 in each case protrude in the two capillary tubes 14, 16. At the external ends, the capillary tubes are sloped at a Brewster angle $\alpha$ and Brewster windows 30 are attached with glass solder to this slope. A thin glass solder disk is suitably used for this purpose so that an areal soldering is achieved between the slope and the Brewster window.

In FIG. 1, a hole 32 is applied in the righthand end wall 6 into which an exhaust pipe 34 is inserted which is also attached and sealed by means of glass solder 36. The anode pins 26 and 28 are also attached and sealed by means of glass solder.

Furthermore, the tube is provided in a known manner with a cathode 37 in the form of a thin-walled aluminum cylinder which is inserted into the tube 4 and which is attached to a connecting pin 39 which is passed through one of the end walls, the end wall 8 in this case. This cathode cylinder 37 and its connecting pin 39 are shown dashed in FIG. 1, the connecting pin 39 is also soldered into the end wall 8.

Production can be effected, for example, in such a manner that initially the Brewster windows are first soldered onto the capillary tubes and the anode pins 26, 28 are soldered in. Adding the solder rings and the solder disks, the end walls 6 and 8 are then inserted into the tube body 4. During this process, the end faces of the cathode cylinder can be used as stops. Furthermore, the capillary tubes are inserted into the end walls and held in alignment. The parts can then be soldered, as mentioned above, in one operating cycle when the solder joints have been lined up.

In the gas discharge tube reproduced in an exploded view in FIG. 2, the individual components essentially correspond to those of FIG. 1. The individual components of this embodiment are shown mounted in FIG. 3.

Reference is made to the previous description of FIG. 1 with respect to details corresponding to those in the embodiment of FIG. 1. In deviation from this, the two end walls 6 and 8 are here constructed as simple disks without shoulders. For the soldering, solder disks 17 and 19 are provided which correspond to those of the end walls with respect to the outside diameter and the diameter of the holes 13 and 21, respectively. The end walls and the associated solder disks also have, on the one hand, identical holes 15 for the exhaust pipe 34 and, on the other hand, holes 23 for the cathode connecting pin 39. The end walls 6 and 8 of the associated solder disks 17 and 19 can be produced in each case from glass plates or sintered glass solder disks by means of ultrasonic machining using the same tools. The lack of shoulders on the end walls is of advantage in this connection.

The gas discharge tube is soldered with its axis perpendicular. In this arrangement, the end wall 6, as shown in FIG. 3, rests on the end of the cathode cylinder 37 which is dimensioned in such a manner that the solder disk 17 is essentially flush with the upper edge of the tube body 4.

The lower end of the cathode cylinder 37 rests on the solder disk 19 which, in turn, rests on the end wall 8, which, in turn, is flush with the lower end of the tube body 4. A support disk 41 is here provided as holder on which rest the tube body 4 and the end wall 8.

Figure 3:
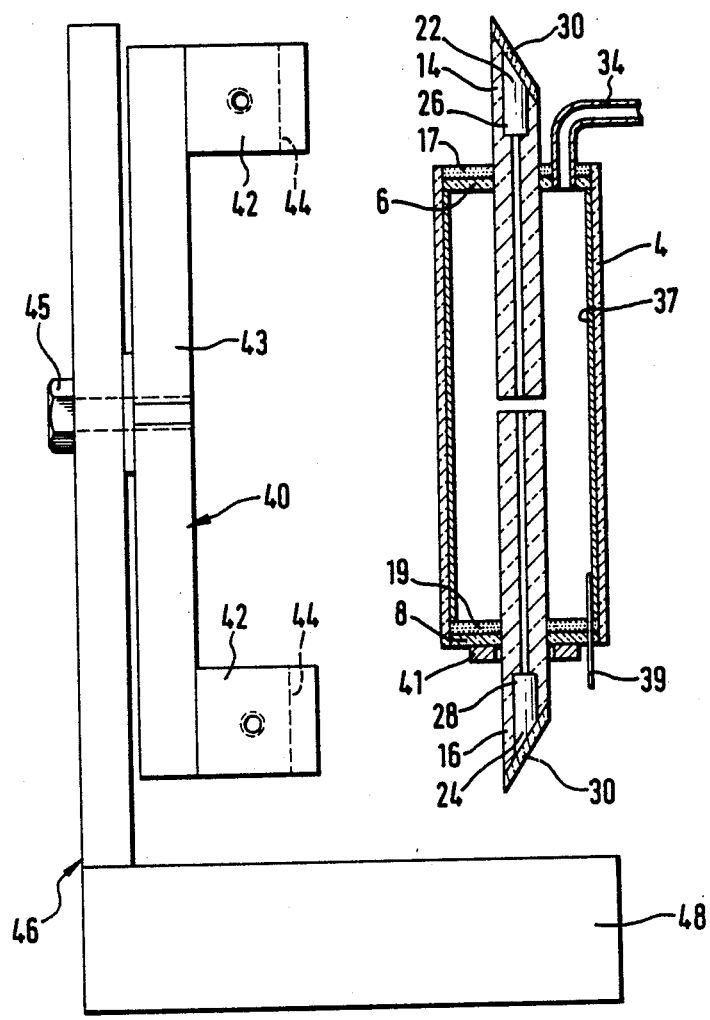
FIG. 3 shows a device producing a tube according to FIG. 2.

To align the capillary tubes, a device as shown in FIG. 3 is suitably used. On a gripping bench 40 having a base plate 43, clamping blocks 42 are here mounted which are provided at their upper ends with wedge-shaped grooves 44 which are aligned with one another and into which the tube 2, which has been preassembled in the manner described, is inserted with the ends of the capillary tubes 14 and 16 protruding on the outside. This is followed by a mechanical clamping of the capillary tubes by means of clamping means, not shown in the drawing, in the grooves 44. In the embodiment shown in FIG. 3, the clamping bench 40 is attached by means of a screw 45 to an L-shaped carrier 46 with a base 48. In this manner, it is possible to align the two capillary tubes very accurately in their axial direction and with respect to the position of the Brewster windows which are essential for the operation and the efficiency of the gas discharge tube. The clearance between the end walls and the tube body 4, on the one hand, and the capillary tubes 14 and 16, on the other hand, must be selected in such a manner that stress-free alignment is possible.

The gas discharge tube thus mounted on the device is then inserted with the device upright into a furnace so that the solder of the solder disks 17 and 19 can flow into the solder joints at the inner and outer circumferences of the end walls and of the holes 15 and 23, complete wetting of the joint surfaces being achieved under the force of gravity and by capillary action. The solder joint should be produced at a heating and cooling rate of about 7° C./min. Naturally, it is also possible initially to solder the capillary tubes, prepared in the above manner, if necessary together with the anode pins and, if necessary the connecting pin 39 of the cathode 37, separately to the end walls and subsequently to solder the end walls prepared in this manner to the tube body 4. if the abovementioned cristallizing glass solder "8597" is used, the same glass solder can be used for successive soldering operations. Otherwise, glass solders having sufficiently different soldering temperatures must be used.

We claim:

1. A He—Ne gas discharge tube comprising a cylindrical tube body having opposite ends, a tubular cathode cylinder having opposite ends received in coaxial relation in said tube body so that the ends of said cathode cylinder are spaced inwardly from the ends of said tube body, a pair of substantially planar, circular, disklike end walls snugly received in the opposite ends of said tube body, each of said end walls having a hole therethrough and having an inwardly facing inner side and an outwardly facing outer side, at least one of said end walls engaging the adjacent end of said cathode cylinder so that said cathode cylinder functions as a stop for positioning said at least one end wall in said tube body, a pair of glass capillary tubes aligned along a common axis, each of said capillary tubes being received in the hole in a different one of said end walls and extending outwardly from the respective end wall thereof terminating in an outer end, an exhaust pipe sealingly mounted in one of said end walls so that it communicates with the interior of said cathode cylinder, Brewster windows closing the outer ends of said capillary tubes, anode elements in said capillary tubes adjacent the outer ends thereof, a connecting pin connected to said cathode cylinder and extending through one of said end walls, said tube body, said end walls and said capillary tubes each consisting of either calcium alkalisilicate glass or calcium alumosilicate glass, and glass solder applied to the inner side of one of said end walls and to the outer side of the other of said end walls, said glass solder sealingly connecting said end walls to said tube body and to the respective capillary tubes thereof, said glass solder also sealingly connecting one of said end walls to said exhaust pipe and sealingly connecting one of said end walls to said connecting pin.

2. In the He—Ne gas discharge tube of claim 1, said capillary tubes having integrally formed inner end portions and outer end portions, said outer end portions terminating in said outer ends, internal diameters of said outer end portions being greater than internal diameters of the respective inner end portions thereof, the outer ends of said capillary tubes being inclined at the Brewster angle, said Brewster windows being glass soldered to the outer ends of said capillary tubes, said anode elements comprising anode pins which extend through walls of the respective outer end portions of said capillary tubes.

3. In the He—Ne gas discharge tube of claim 1, said end walls having shoulders formed around the outer circumferential peripheries thereof and around the holes therein, said shoulders forming solder gaps for said glass solder.

4. In the He—Ne gas discharge tube of claim 3, said anode elements, said connecting pin and said exhaust pipe being soldered in place with solder rings.

5. In the He—Ne gas discharge tube of claim 1, said glass solder being applied as a pair of solder discs, one of said solder discs being applied to the inner side of one of said end walls, the other of said discs being applied to the outer side of the other of said end walls, said solder discs having diameters which are substantially the same as their respective end walls, said solder discs having holes therethrough for said capillary tubes, one of said solder discs having a hole therethrough for said connecting pin, one of said solder discs having a hole therethrough for said exhaust pipe.

* * * * *